United States Patent [19]

Carlson

[11] Patent Number: 4,716,015

[45] Date of Patent: Dec. 29, 1987

[54] MODULAR NUCLEAR FUEL ASSEMBLY DESIGN

[75] Inventor: William R. Carlson, Pittsburgh, Pa.

[73] Assignee: Westinghouse Electric Corp., Pittsburgh, Pa.

[21] Appl. No.: 734,372

[22] Filed: May 15, 1985

[51] Int. Cl.⁴ .............................................. G21C 3/32
[52] U.S. Cl. .................... 376/445; 376/446; 376/434; 403/388; 403/393
[58] Field of Search .............. 376/352, 446, 445, 434, 376/448; 403/408.1, 388, 393

[56] References Cited

U.S. PATENT DOCUMENTS

| | | | |
|---|---|---|---|
| 1,094,020 | 4/1914 | Robinson | 403/388 X |
| 2,057,777 | 10/1936 | Hobbs | 403/393 X |
| 3,133,867 | 5/1964 | Frisch | 376/438 |
| 3,382,153 | 5/1968 | Bigge et al. | |
| 3,567,582 | 3/1971 | Van Dievoet et al. | |
| 4,155,807 | 5/1979 | Schreiber et al. | |
| 4,285,769 | 8/1981 | Specker et al. | |
| 4,285,771 | 8/1981 | Downs | |
| 4,378,329 | 3/1983 | Uchikawa et al. | |
| 4,418,036 | 11/1983 | Gjertsen et al. | |
| 4,499,047 | 2/1985 | Borrman et al. | 376/434 |
| 4,560,532 | 12/1985 | Barry et al. | 376/434 |

FOREIGN PATENT DOCUMENTS 1016113 5/1984 United Kingdom .

Primary Examiner—John F. Terapane
Assistant Examiner—John S. Maples

[57] ABSTRACT

A modular component nuclear fuel assembly design in which sub-assembly fuel modules are joined together to form an integral fuel assembly. The invention permits a defective or damaged fuel assembly to be reconstituted from new sub-assembly fuel modules thereby facilitating quick repair. By using sub-assembly fuel modules, the invention allows for modular enrichment and/or burnup variations within a fuel assembly and permits tailoring of reactivity and/or fuel burnup within the core thereby enhancing fuel management and utilization and enabling peaking factors to be reduced. The sub-assembly fuel module design permits easy access to interior fuel rods thereby affording an increased fuel rod surveillance capability and further permits advanced fuel design to be incorporated into a reactor core with a minimum of risk.

21 Claims, 13 Drawing Figures

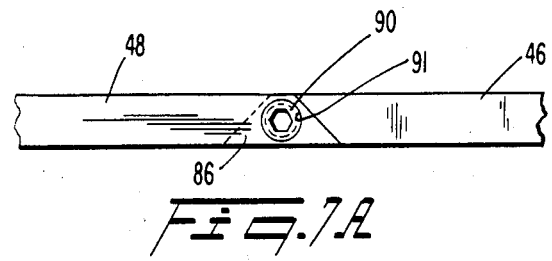
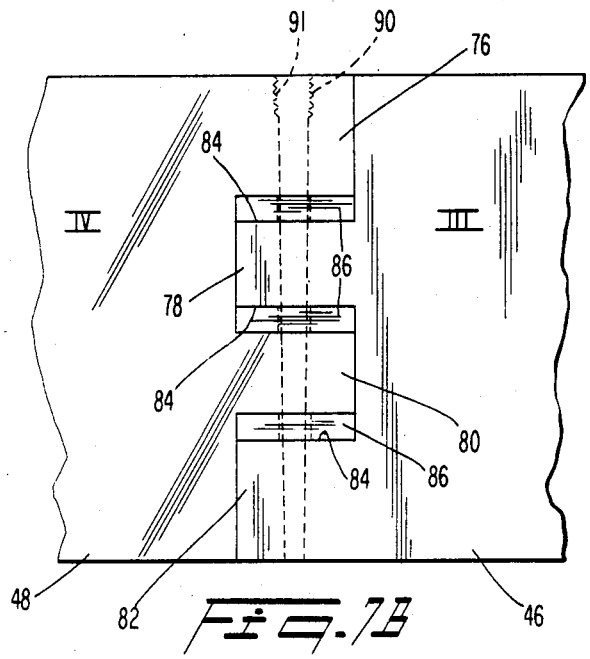
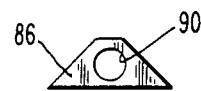

MODULAR NUCLEAR FUEL ASSEMBLY DESIGN

BACKGROUND OF THE INVENTION

1. Field of the Invention

The present invention relates to a nuclear fuel assembly and more particularly to a nuclear fuel assembly comprising a plurality of sub-assembly fuel modules which are joined together to form an integral fuel assembly.

2. Description of the Prior Art

Prior art nuclear fuel assemblies are typically formed from a plurality of fuel rods supported in a skeletal assembly comprising a top and bottom nozzle, guide tube thimbles, and an instrument tube thimble extending between the top and bottom nozzles. A plurality of grid assemblies are axially spaced along the guide and instrument tube thimbles for laterally supporting the fuel rods.

The fuel rods typically comprise uranium dioxide fuel pellets contained within Zircaloy tubing which is plugged and sealed at its ends to encapsulate the fuel.

The bottom nozzle serves as a lower support structural element for the fuel assembly and directs coolant flow distribution to and through the fuel assembly. A typical bottom nozzle is fabricated from stainless steel and comprises a perforated plate having downwardly extending corner angle legs which form a plenum for the inlet coolant flow. The perforated plate prevents "downward" ejection of fuel rods from the fuel assembly. As used herein, directional words such as "up", "down", "top", "bottom", "left" and "right" are for establishing conventions only and should not be construed to limit the invention in any way.

Axial or holddown loads imposed on the fuel assembly as well as the weight of the fuel assembly are transmitted through the bottom nozzle to a lower core plate which is a well known part of the reactor internals.

The top nozzle functions as the upper structural element of the fuel assembly. A top nozzle may typically comprise a perforated plate having holes to accept the guide and instrument tube thimbles and perforations for permitting the flow of coolant "upward", out of the fuel assembly.

The guide tube thimbles are structural members which also provide channels for control rods or the like. A typical guide tube is fabricated from Zircaloy tubing. The lower end of the guide thimble is typically attached to the bottom nozzle by means of an end plug which is fastened to the bottom nozzle by a weld locked screw or the like. The fuel assembly will typically have a centrally located instrumentation tube thimble held between the top and bottom nozzles for accommodating in-core neutron detectors or the like.

As alluded to above, the fuel rods are typically provided with lateral support along their length by grid assemblies which maintain proper lateral spacing between fuel rods. Typically, each fuel rod will be supported by four or six contact points at each grid location by a combination of support dimples and springs. Prior art grid assemblies are known which are fabricated from individual slotted straps, interlocked and brazed in an egg-crate arrangement. Grid straps are usually fabricated from Inconel because of its corrosion resistance and high strength. However, Zircaloy grid straps have also been used to enhance neutron economy within the core.

The grid assemblies are axially spaced along the guide tube thimbles and are captured by bulge joints or the like formed in the guide tube thimbles at the grid assembly locations, or by other fasteners, in order to create an integrated skeletal structure in which the fuel rods can be inserted.

In U.S. Pat. No. 4,620,960 an apparatus is disclosed for mounting a top nozzle on a fuel assembly in a manner whereby it may be readily removed in order to allow access to and removal of a failed rod.

In commonly assigned, co-pending Ser. No. 564,049, filed Dec. 21, 1983 a fuel assembly is described in which partial grid assembly structures are used to laterally support or deflect coolant flow through only a portion of the fuel rods within the fuel assembly.

However, known prior art fuel assembly designs fail to provide for modular fuel assembly reconstitution which in turn facilitates repair of damaged fuel assemblies by permitting quick replacement of a prefabricated portion of the assembly. For example, if a corner of a grid strap of a grid assembly of a prior art fuel assembly is damaged either during transport or refueling operations, it may be necessary to scrap for salvage the entire fuel assembly.

Further, it is well known that at the periphery of a reactor core, specifically near a reflector or a baffle plate, the power generated is very low, and the fuel in the fuel assemblies directly opposite a reflector or baffle plate tends to deplete very slowly, thereby creating a burnup skew within both the reactor core and the fuel assembly. Since, during refueling, it is common practice to load the majority of feed fuel assemblies into peripheral core positions, fuel assemblies previously occupying those positions are usually repositioned at inboard core locations. Prior art fuel assemblies, when repositioned from peripheral to inboard locations, tend to lead the core in power peaking factors. In addition, core symmetry considerations restrict the number of fuel shuffling options available. When a large, prior art fuel assembly, for example a 19×19 lattice design, is relocated within a reactor core during refueling operations, it may be difficult to position such relatively unburned fuel at locations where it will avoid any power peaking concerns.

Further, large prior art fuel assemblies such as a 19×19 lattice, do not generally have the fuel enrichment within the fuel assembly tailored to avoid the power peaking and core symmetry considerations discussed above.

In addition, during refueling, it is beneficial to be able to inspect as many fuel rods as possible to check for rod bow, surface appearance, etc. With present fuel assemblies the most straightforward and commonly employed inspection method comprises a visual examination. A simple visual inspection is, however, limited to only the peripheral rods of a prior art fuel assembly. In other words, unless the fuel assembly design permits quick disassembly, interior rods cannot be visually inspected in a simple and expedient manner. In addition, with conventional large fuel assemblies, whenever it is desired to incorporate an advanced product into a demonstration program, an entire fuel assembly is at risk since the demonstration fuel assembly must be the same size as the other fuel assemblies presently in the core in order to properly meld into the core geometry.

SUMMARY OF THE INVENTION

It is therefore an object of the present invention to provide a fuel assembly comprising a plurality of sub-assembly fuel modules.

It is a further object of the invention to provide a nuclear fuel assembly in which damaged sub-assembly modules can be easily and inexpensively replaced and/or repaired.

It is a still further object of the present invention to provide a nuclear fuel assembly which allows for increased fuel management flexibility.

It is yet a further object of the invention to provide a fuel assembly design in which nuclear power peaking factors can be reduced.

It is yet a further object of the invention to permit enhanced utilization of low burnup fuel.

It is yet a further object of the present invention to permit easy access and inspection of interior fuel rods of a fuel assembly.

It is yet a further object of the invention to provide a nuclear fuel assembly which permits incorporation of advanced products into demonstration programs at a minimum of risk.

To achieve the foregoing and other objects and in accordance with the purpose of the present invention, as embodied and broadly described herein, a fuel assembly for a nuclear reactor core is provided which comprises at least two sub-assembly fuel modules each containing a plurality of axially extending fuel rods. Each of the sub-assembly fuel modules comprises a bottom nozzle module section, a top nozzle module section and at least one guide tube thimble extending between the top and bottom nozzle module sections. At least two fuel rod spacer grid assembly module sections are axially spaced along, and captured by, the guide tube thimbles for laterally supporting fuel rods. The bottom nozzle module and top nozzle module section of the sub-assembly fuel modules each are provided with complementary joining means for securely connecting the sub-assembly fuel modules into an integral fuel assembly. Preferably, the joining means comprises complementary, interlocking, finger-like protuberances formed in the top and bottom nozzle module sections. The interlocking finger-like protuberances preferably have a generally trapezoidal cross section with passages extending therethrough. The passages of the interlocking fingers align to form a continuous passage. A fastening device, such as a connecting pin, may be inserted through the continuous passage to securely join adjacent top and bottom nozzle module sections to one other.

Preferably, the interlocking finger-like protuberances of adjacent top nozzle modules are dimensioned to provide an axial space therebetween in order to maintain alignment between the upper nozzle module sections of adjacent sub-assembly fuel modules. This is especially advantageous in connection with the present modular design since each sub-assembly fuel module will experience growth, both relative to its initial dimensions and relative to each other, during operation. In addition, a fuel assembly may be reconstituted from sub-assembly fuel modules different from those originally used. When a fuel assembly is so reconstituted, accommodation must be made for dimensional differences such as those resulting from irradiation growth. Preferably, variable size adjusting shims may be placed in the openings or spaces between interlocking fingers. These adjusting shims should also be provided with a passage which aligns with the passages in the interlocking fingers so that a connecting pin can be inserted in the same manner as described above.

A method of constructing, reconstituting, repairing, and inspecting a nuclear fuel assembly is also described which comprises providing sub-assembly fuel modules, each having top and bottom nozzle module sections; interlocking adjacent sub-assembly fuel modules at said top and bottom module sections; and securely joining said interlocked, adjacent sub-assembly fuel modules to form an integral fuel assembly.

Advantageously each of the bottom nozzle module sections have finger-like protrusions which interlock with finger-like protrusions of adjacent sub-assembly fuel modules and the step of interlocking further comprises aligning interlocking finger-like protrusions of adjacent sub-assembly fuel modules.

It is further advantageous to provide each of the top nozzle module sections with finger-like protrustions which interlock with finger-like protrusions on adjacent sub-assembly fuel modules to form an axial space between the finger-like protrusions of adjacent top nozzle module sections and to axially align adjacent sub-assembly fuel modules within the axial space and to laterally align the interlocking finger-like protrusions of adjacent fuel assemblies.

It is further advantageous to remove a sub-assembly fuel module from said nuclear fuel assembly when necessary and to provide adjacent sub-assembly fuel modules with different uranium enrichments for reducing power peaking factors and enhancing fuel utilization.

Further, applicant has found it is advantageous to provide adjacent sub-assembly fuel modules having different burnup distributions for reducing power peaking factors and enhancing fuel utilization.

Finally, applicant has found it advantageous to operate the nuclear fuel assembly comprised of applicant's sub-assembly modules in a nuclear reactor core; removing at least one sub-assembly fuel module from said nuclear fuel assembly; inspecting peripheral rods of the removed sub-assembly fuel module; and repeating the above steps with the removed or another sub-assembly fuel module.

Thus, the present invention provides for modular reconstruction of a nuclear fuel assembly thereby allowing quick repair of damaged fuel assemblies and further provides for modular enrichment and/or burnup tailoring within a fuel assembly. This in turn permits more flexible fuel management, reductions in power peaking factors, and enhanced utilization of low burnup fuel. The modular fuel assembly design described herein also provides easy access to interior fuel rods for inspection thereby facilitating increased fuel rod surveillance. Further, by constructing a fuel assembly from sub-assembly modules, a means is provided for incorporating advanced products into demonstration programs at a minimum of risk since an entire demonstration fuel assembly is no longer required.

BRIEF DESCRIPTION OF THE DRAWINGS

The accompanying drawings, which are incorporated in and form a part of the specification, illustrate a presently preferred embodiment of the invention and together with the description, serve to explain the principles of the invention. In the drawings:

FIG. 7A is a top, plan, fragmentary view illustrating an interface between adjacent top nozzle module sections;

FIG. 7B is an elevation, illustrating an interface between adjacent top nozzle module sections of FIG. 7A;

FIGS. 7C and 7D are plan and elevation views respectively of an adjusting shim for use in joining top nozzle module sections as illustrated in FIG. 7B.

DETAILED DESCRIPTION OF THE PREFERRED EMBODIMENT

Reference will now be made in detail to the presently preferred embodiment of the invention, an example of which is illustrated in the accompanying drawings.

Figure 1:
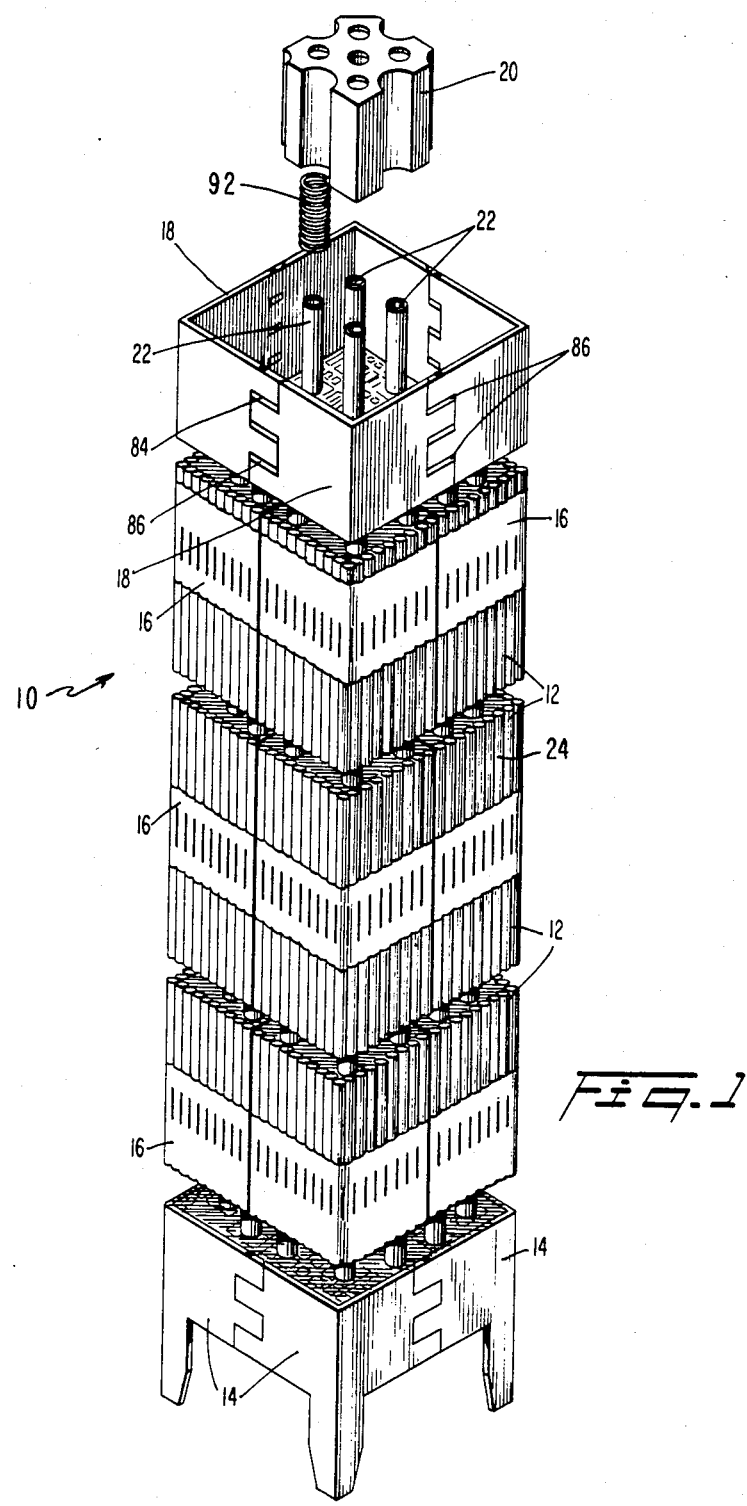
FIG. 1 is a perspective, partially exploded, fragmentary view of a nuclear fuel assembly comprising sub-assembly fuel modules.

Turning first to FIG. 1, the numeral 10 generally designates the modular component fuel assembly design of the present invention. A typical fuel assembly may comprise a 17×17, an 18×18, a 19×19 or other array of fuel rods arranged in a square lattice. In accordance with the present invention, if a fuel assembly comprises for example an 18×18 array of fuel elements, it may be divided into four 9×9 generally identical sub-assemblies 12. However, in order to appreciate the more general case, the description which follows will be directed to a 19×19 fuel assembly in which all sub-assembly fuel modules are not identical but in which diagonally opposing sub-assembly fuel modules are interchangeable. As used herein in connection with the described embodiment, a sub-assembly fuel module is intended to comprise a bottom nozzle modular section 14, a plurality of axially spaced fuel rod grid sub-assembly module sections 16, a top nozzle module section 18, a top nozzle plate module section 20, a plurality of guide tube thimbles 22, and a complement of fuel rods 24. As detailed below, in accordance with the example presented, four sub-assembly fuel modules 12, hereinafter referred to as quarter sections, when joined together will form a complete fuel assembly 10.

It should be appreciated that the present design is simple in nature and only requires relatively minor modifications to the top and bottom nozzle design and to the fuel rod spacer grid assembly design and that the modular sub-assembly fuel modules described herein permit modular fuel assembly reconstitution thereby allowing quick repair of damaged fuel assemblies. In addition, the fuel assembly design described herein permits various sub-assembly fuel modules within a fuel assembly to have varying enrichments and/or burnup distribution thereby permitting the reactivity and/or burnup within a fuel assembly to be tailored in a manner to obtain a more homogeneous power distribution, both within the fuel assembly itself and in the reactor core. This in turn leads to fuel management flexibility and reductions in power peaking factors which in turn permits enhanced utilization of previously low burnup fuel. For example, at the periphery of a reactor core, for instance near a reflector or a baffle plate, the power generated is quite low and the fuel nearby experiences only low burnup. With the present invention, low burnup fuel modules can be more effectively utilized in subsequent cycles by selectively placing these low burnup modules into fuel assembly and core configurations which permit the usual concerns associated with power peaking to be alleviated, while at the same time burning the fuel in these fuel modules to more uniformly approach the burnup of the remainder of the fuel region.

In addition, it is customary for manufacturers and operators to periodically inspect fuel assemblies to check for fuel rod bow, surface appearance, and other defects. With conventional fuel assembly designs, only the peripheral rods can be readily inspected using visual techniques. In accordance with the present invention, the peripheral rods of each sub-assembly fuel module can be easily inspected merely by disassembly in the manner discussed below. Therefore, access can now be had to the interior sides of each sub-assembly fuel module thereby permitting more detailed and effective diagnostic inspections and fuel rod surveillance.

An additional benefit of the modular component fuel assembly design of the present invention is that it permits the incorporation of advanced products into demonstration programs with a minimum of risk. For example, with conventional fuel assemblies, if a demonstration assembly was to be incorporated into a core, an entire assembly, having for example a 19×19 fuel rod lattice, would be required. In accordance with the present invention, the demonstration fuel can be reduced to a single sub-assembly fuel module.

Figure 2:
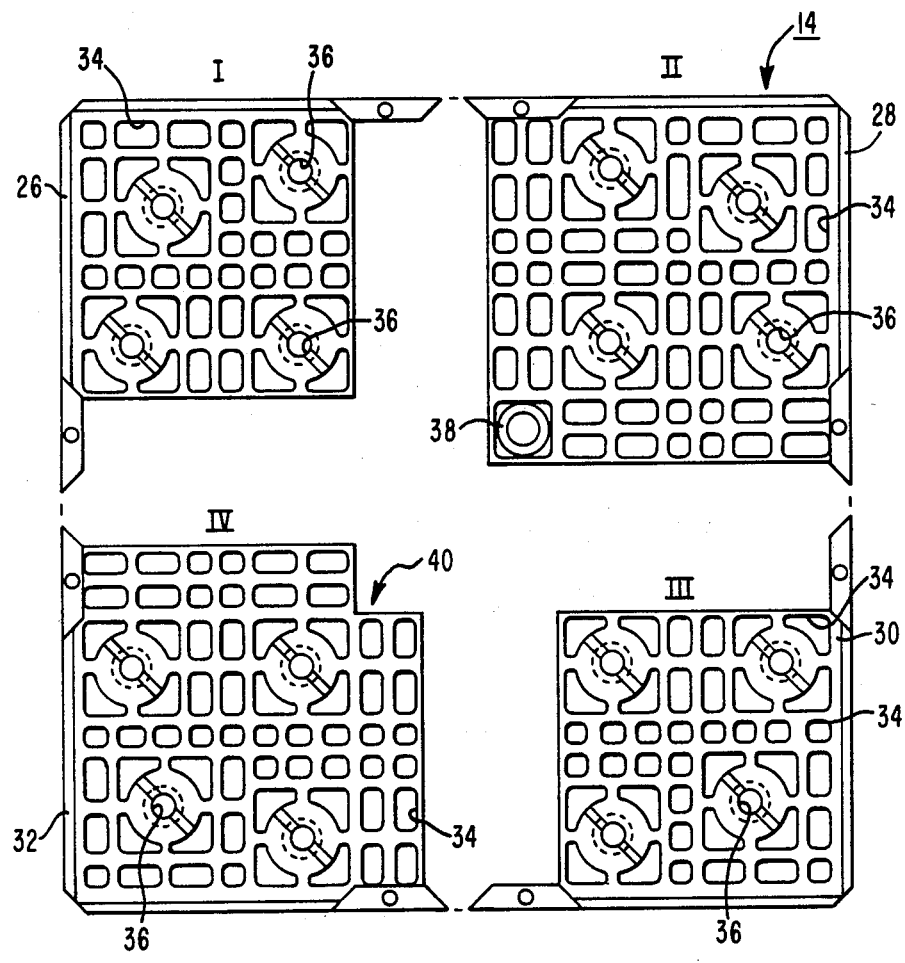
FIG. 2 is a plan, exploded view of the bottom nozzle module sections of FIG. 1.
Figure 3:
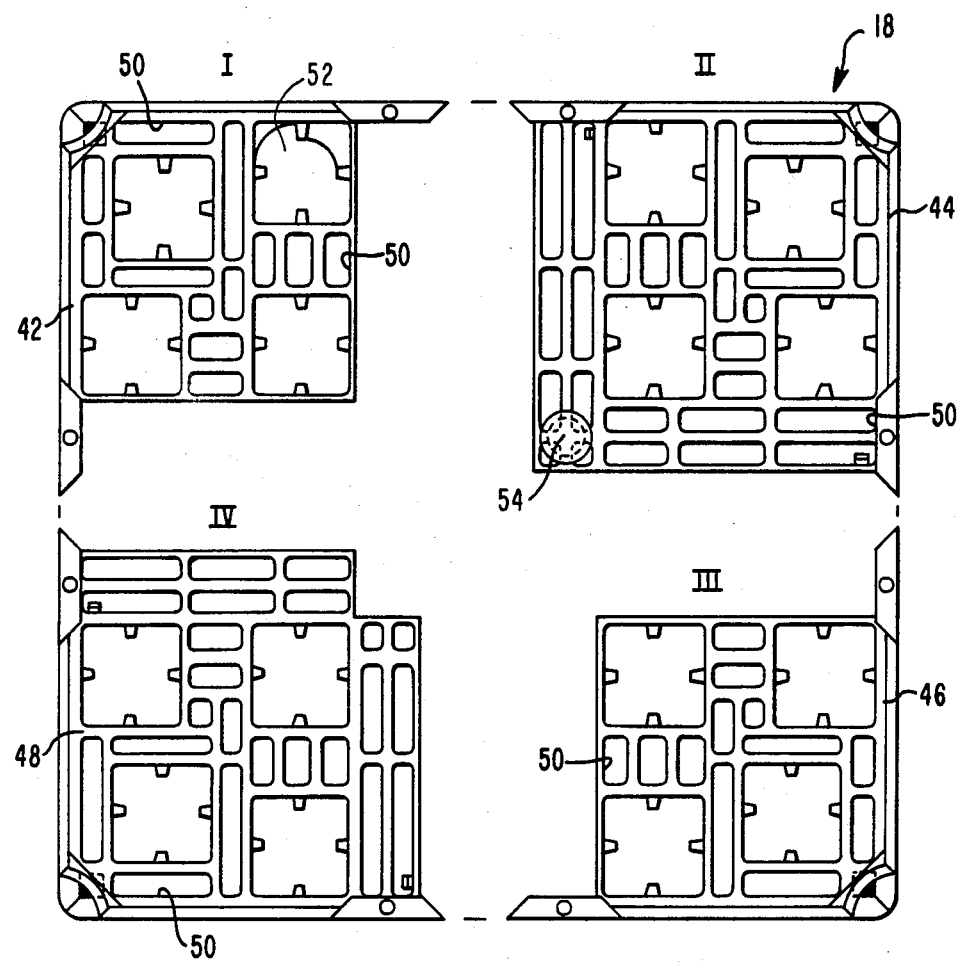
FIG. 3 is a plan, exploded view illustrating the top nozzle module sections of FIG. 1.
Figure 4:
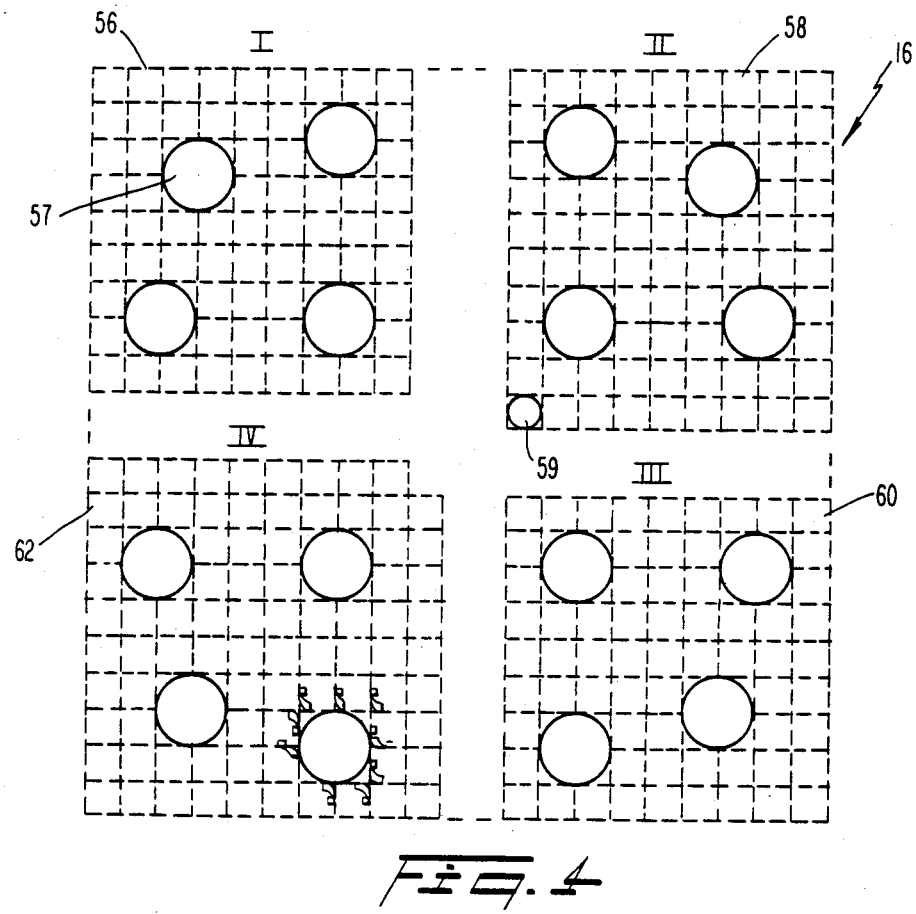
FIG. 4 is a plan, exploded view illustrating the grid module sections of FIG. 1.

It is noted in passing that one of the most frequently occurring areas of fuel assembly damage during transport or refueling is damaged to a corner of a fuel rod grid assembly. Previously, an entire fuel assembly might have to be scrapped when such damage occurred. In accordance with the present invention, the fuel assembly can be reconstituted, by merely replacing the damaged sub-assembly fuel module. FIGS. 2, 3 and 4 respectively illustrate a preferred embodiment of a bottom nozzle, top nozzle, and spacer grid assembly design for sub-assembly fuel modules which can be joined to form a single, integral, fuel assembly.

Turning now to FIG. 2, there is illustrated a plan, exploded view illustrating how the bottom nozzle module sections of adjacent sub-assembly fuel modules cooperate to form an integral fuel assembly. The assembled bottom nozzle module sections 14 may be similar in design to a conventional bottom nozzle such as that used in the Westinghouse Electric Corporation Advanced Pressurized Water Reactor (APWR) fuel assembly design or other current standard fuel assembly designs. An assembled bottom nozzle 14 supports an integral fuel assembly from below and provides a plenum region through which coolant can pass into the fuel assembly during operation. Such structures are well known to those of skill in the design of nuclear reactor cores. In addition to having a plurality of holes 34 for passing flowing coolant into the fuel assembly, each of the bottom nozzle module sections 26, 28, 30 and 32, have one or more guide tube thimble holes 36 for accepting and securing the guide tube thimbles 22 to the bottom nozzle module sections.

For convention, the bottom nozzle module section 26 will be designated a portion of a sub-assembly fuel module I, the bottom nozzle module section 28 will be designated a portion of a sub-assembly fuel module II, the bottom nozzle module section 30 will be designated a portion of a sub-assembly fuel module III, and the bottom nozzle module section 32 will be designated a portion of a sub-assembly fuel module IV.

Since the exemplary design discussed herein relates to a 19×19 fuel assembly, modules I and III each comprise a 9×9 sub-assembly fuel module and modules II and IV will each comprise a 10×10 sub-assembly fuel module. Module II contains a lattice position 38 containing a hole for accommodating an instrumentation tube therein. The diagonally opposite bottom nozzle module section 32 contains an empty space 40 in its lattice for accommodating the instrumentation tube lattice position 38 of bottom nozzle module section 28. As will be readily apparent, when the four bottom nozzle modules are joined together in the manner detailed below, they form a 19×19 square lattice.

Turning to FIG. 3, there is illustrated a plan, exploded view of a top nozzle assembly 18. In the illustrated embodiment, the top nozzle assembly 18 comprises four top nozzle module sections 42, 44, 46 and 48 which respectively correspond to sub-assembly fuel modules I, II, III and IV. As will be clear to the artisan, the top nozzle module sections when joined together, will form a conventional fuel assembly having coolant passages 50 as well as passages 52 for accommodating the guide tube thimbles 22. The above mentioned instrumentation tube is accommodated by top nozzle module section 44 by means of a passage 54.

Turning now to FIG. 4, there is illustrated a plan, exploded view of a typical spacer grid assembly location comprising four spacer grid assembly module sections according to the present invention. Spacer grid assembly sections 56, 58, 60 and 62 correspond to the sub-assembly fuel modules I, II, III and IV respectively. The spacer grid assemblies may be similar to those employed in the Westinghouse Electric Corporation APWR fuel assembly design, or may for example be similar to conventional spacer grid assemblies such as those described in U.S. Pat. Nos. 3,379,619 and 4,061,536 which generally comprise an assembly of interfitted straps of an egg-crate configuration which form cells for accepting fuel rods. Each spacer grid assembly cell supports one fuel rod at a given axial location in a fuel assembly through the use of spring fingers and dimples which frictionally engage the fuel rods, typically in a six-point support arrangement. The spacer grid assemblies are well known in the art and are used to precisely maintain the lateral spacing between fuel rods, to prevent rod vibration, to provide lateral support, and, as alluded to above, to frictionally restrain the rods against axial movement. It is sufficient that the spacer grid assemblies support the fuel rods in an upstanding spaced array. If desired, the spacer grid assemblies may be provided with coolant flow mixing vanes depending upon the specific fuel assembly involved. For purposes of the present invention, it is sufficient to point out that at each axial location along the integral fuel assembly where an integral spacer grid assembly is located, the integral spacer grid assembly will preferably comprise a spacer grid assembly module corresponding to each sub-assembly fuel module. In addition to providing cells through which the fuel rods pass, each of the spacer grid assembly module sections may have one or more locations, i.e., 57, for accommodating the passage of a guide tube thimble. In the embodiment illustrated, a passage 59, is provided for accommodating an instrumentation tube.

Figure 5:
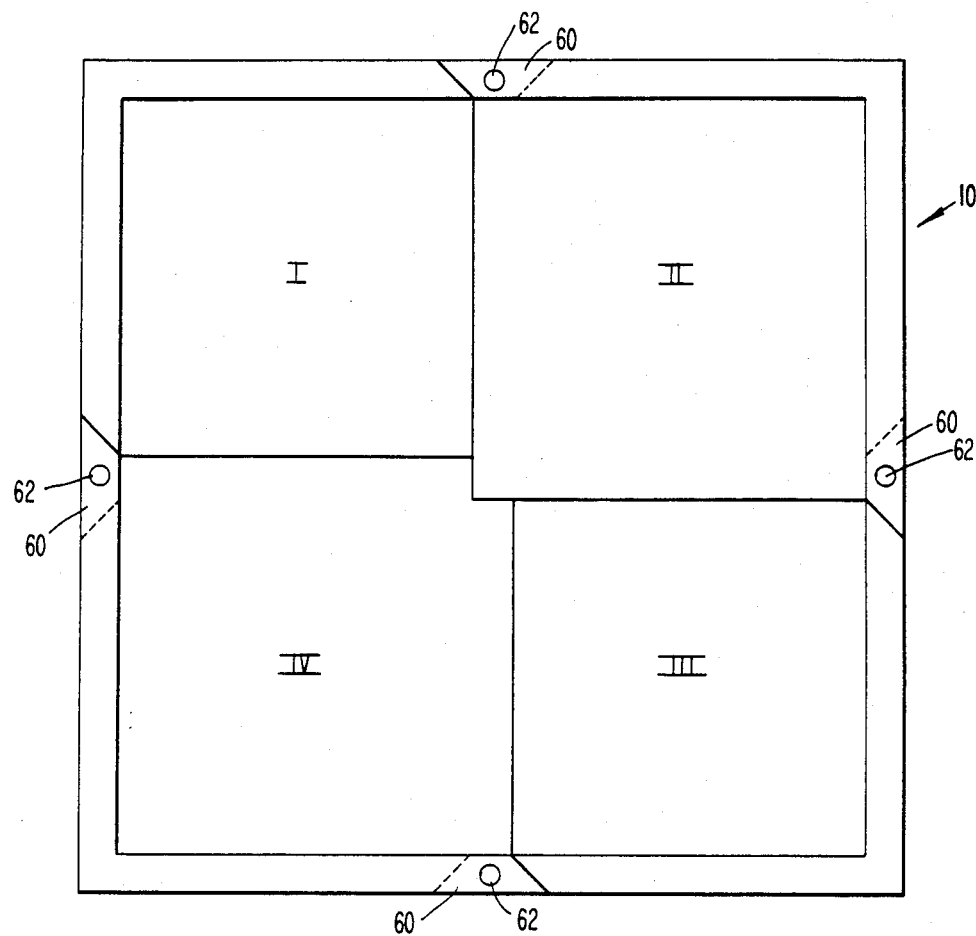
FIG. 5 is a schematic representation of a plan view of an assembled, integral, fuel assembly made of four quarter sub-assembly fuel modules.

Turning now to FIG. 5, there is illustrated in schematic form a top view of an integral fuel assembly where each of the sub-assembly fuel modules I, II, III and IV are joined together. Preferably, both the top and the bottom nozzle module sections are joined together at an interdigitated overlapping portion 60 having a generally trapezoidal cross-section and secured by a fastening means such as a tapered pin 62. When a full complement of sub-assembly fuel modules are properly joined, they form an integral fuel assembly having a familiar square envelope.

Figure 6A:
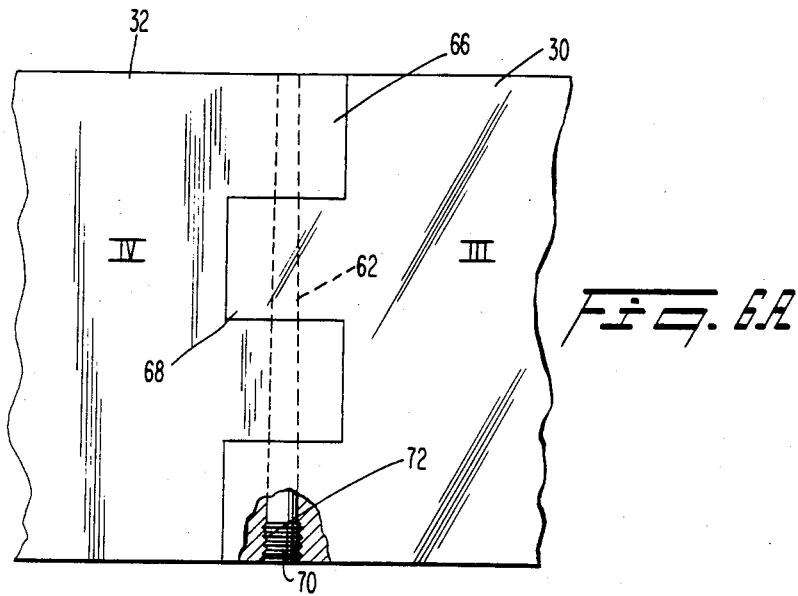
FIG. 6A is an elevation of a bottom nozzle module section interface.
Figure 6B:
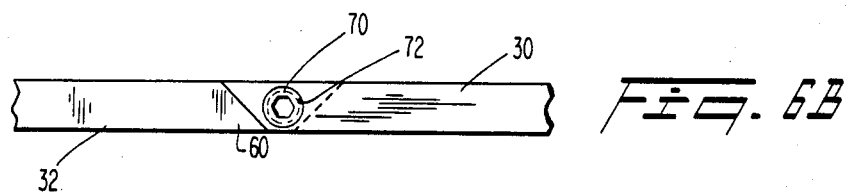
FIG. 6B is a bottom, plan, fragmentary view of an interface between adjacent bottom nozzle module sections of FIG. 6A.
Figure 6C:
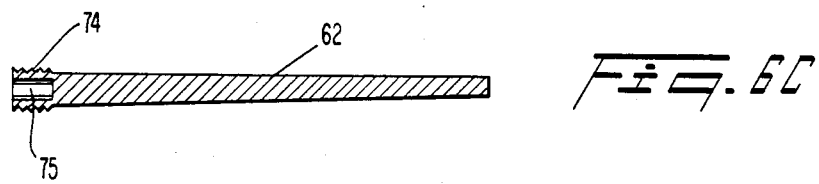
FIG. 6C is a sectional view of a tapered connecting pin for maintaining proper orientation between adjacent bottom nozzle module sections.

Turning now to FIGS. 6A through 6C, there is illustrated a typical bottom nozzle module section connection. As illustrated, the bottom nozzle comprises quarter section sub-assembly fuel modules III and IV joined at their mating surfaces. The bottom nozzle module secion 32 is provided with interlocking fingers 66 which are preferably precision machined to be complementary to interlocking fingers 68 provided on the bottom nozzle module section 30. When the bottom nozzle module sections 30 and 32 are interconnected, they form a tight fitting smooth surface. It will be appreciated by the artisan that the configuration of the interlocking fingers 66 and 68 of FIG. 6A is exemplary only and other interlocking configurations or other finger-like protuberances may alternatively be employed.

In order to insure that the bottom nozzle module sections 30 and 32 remain securely locked in place, an easily removable means may be provided for fastening them together. Such means may comprise a hole 70 which passes through the interlocking fingers 66 and 68 and which is provided at its bottom end with an internally threaded portion 72. As best illustrated in FIGS. 6A and 6B, the interlocking fingers 66 and 68 preferably have opposing surfaces along which they interface. After assembly, the tapered connecting pin 62 (See FIG. 6C) is inserted through the hole 70 and is captured in the threaded recess 72 by means of a threaded portion 74. The pin may have a hexagonal drive indent 75 so that it may be torqued by an allen wrench or the like.

Turning now to FIG. 7B there is illustrated a connection between adjacent top nozzle module sections 46 and 48. The top nozzle module sections 46 and 48 are connected in a manner similar to that described above for the bottom nozzle module sections except that provision is made for permitting differential axial growth of adjacent sub-assembly fuel modules. In this regard, the interdigitated fingers 78 and 80 of top nozzle module sections 48 and 46 respectively are machined slightly differently from those of the corresponding bottom nozzle module sections. Each of the top nozzle module sections 46 and 48 preferably has an outside finger 76 and 82 respectively and an inside of the finger 80 and 78 respectively. The inside interdigitated fingers 78 and 80 are preferably machined so that they have a smaller axial dimension than the outside fingers 76 and 82. As used herein, the word axial should be taken to indicate the axial direction of the fuel assembly 10. As a result of the above dimensioning, axial spaces 84 are formed between the interdigitated fingers. As with the bottom nozzle module sections, the interdigitated fingers preferably have a trapezoidal prism cross section along their opposing surfaces. Thus, the spaces or openings 84 are trapezoidal prisms in shape.

As seen in FIG. 7C, adjusting shims 86, having a cross section similar to the trapezoidal cross section shown in FIG. 7A of the interlocking fingers 66 and 68 (see FIG. 6A) are provided. These adjusting shims may be placed in the axial openings 84 to provide a means by which alignment of the upper nozzle modules can be maintained in the case of reconstitution or fuel burnup tailoring. A passage 92, having a threaded opening 91 is provided in a manner similar to that described above with regard to the bottom nozzle module sections and a similar passage 92 is provided in the adjusting shims 86. A connecting pin, similar to pin 62 illustrated in FIG. 6C, may be inserted into the hole 92. The hole 92 and connecting pin are preferably slightly tapered in order to facilitate insertion and removal while at the same time ensuring a snug fit.

It should be understood that since each sub-assembly fuel module will experience axial growth, both relative to its initial dimensions and relative to other sub-assembly fuel modules, the variable size shims 86 and the dimensions of the upper nozzle module section interlocking fingers permit alignment of the sub-assembly fuel modules which have experienced differential axial growth. It should be further understood, that during the initial construction of an integral fuel assembly, the adjusting shims 86 will be of nominal thickness since all new sub-assembly fuel modules should be of a nominal axial dimension. Subsequent to inspection, replacement, etc. of the sub-assembly fuel modules after irradiation, the initial shims used can be reused if the same sub-assembly fuel modules are reused to reform the integral fuel assembly. However, if the fuel assembly is to be reconstituted using sub-assembly fuel modules from different fuel assemblies or using one or more new sub-assembly fuel modules, then shims having varying dimensions will be used in order to account for axial growth differences.

Figure 8:
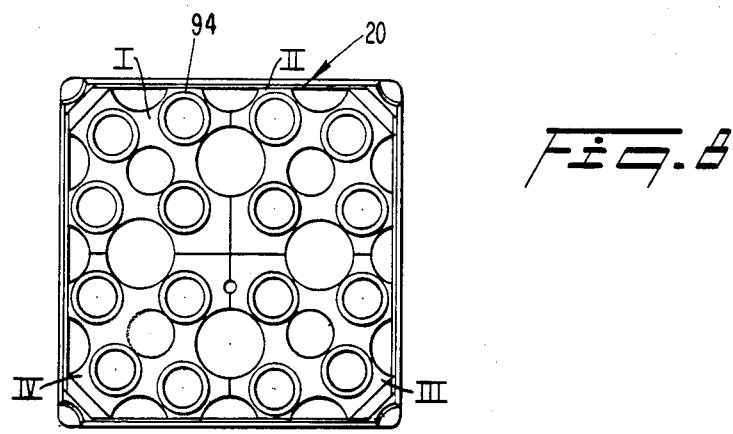
FIG. 8 is a plan view of a top nozzle plate comprising a 2×2 matrix of top nozzle plate quarter sections.

In order to prevent a fuel assembly from "floating" in the core during operation, means are provided for holding the fuel assembly in place. Such means may include holddown springs 92 which are positioned coaxially about the guide tube thimbles 22 which extend from the top nozzle module sections. As best seen in FIG. 2, each sub-assembly fuel module is preferably provided with a top nozzle plate module 20 which is captured by conventional bulging techniques on the guide tube thimbles 22. The top nozzle module sections 20 are biased against reactor internals by the holddown springs 92 to thereby hold the fuel assembly in its proper position. In the embodiment illustrated in FIG. 8, four top nozzle plate modules may be positioned within the plenum defined by the assembled top nozzle module quarter sections to thereby provide a bearing surface between the fuel assembly 10 and the reactor internals (not illustrated). As will be understood by the artisan, each of the top nozzle plate modules is provided with one or more passages 94 in which the upstanding guide tube thimbles 22 are captured. Thus, the top nozzle plate module sections essentially "float" on the holddown springs 92 after assembly, subject to capture by a bulged end of a guide tube thimble.

The foregoing description of the preferred embodiment of the invention has been presented for purposes of illustration and description. It is not intended to be exhaustive or to limit the invention to the precise form disclosed and obviously many modifications and variations are possible in light of the above teachings. For example, the arrangement for joining the fuel assembly modules may use different forms of interdigitated fingers or finger-like protuberances or fastening devices other than tapered pins. Instead of dividing the fuel assembly into quarter sections, a different number of sub-assembly fuel modules may be used to form an integral fuel assembly. The spacer grid assembly structures may comprise any conventional lateral restraining grid device as long as it may be divided into modular sections. Further, the top and bottom nozzle assemblies may comprise any configuration adaptable to be separated into modular sections. The illustrated embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim as my invention:

1. A fuel assembly for a nuclear reactor core comprising at least two sub-assembly fuel modules, each of said sub-assembly modules containing a plurality of axially extending fuel rods and comprising:
   a bottom nozzle module having an associated bottom plate module;
   a top nozzle module having an associated top plate module;
   at least one guide tube extending between said top and bottom modules;
   at least one fuel rod spacer grid module fixed to said guide tube for laterally supporting said fuel rods;
   a joining means including an interlocking means for removably securing the top and bottom nozzle modules respectively of adjacent sub-assembly fuel modules together to form an integral assembly from said sub-assembly modules, said joining means being operable to facilitate rapid assembly and disassembly of said fuel assembly into its component sub-assemblies.

2. The fuel assembly of claim 1 wherein said joining means comprises complementary interlocking fingers formed in each of the top and bottom nozzle modules.

3. The fuel assembly of claim 1 wherein said fuel assembly comprises four sub-assembly fuel modules at least two of which are interchangeable.

4. The fuel assembly of claim 2 wherein the interlocking fingers of adjacent sub-assembly fuel modules have a generally trapezoidal cross-section and a passage extending therethrough, and wherein the passages through adjacent sub-assembly fuel module interlocking fingers are aligned to form a continuous passage through said interlocking fingers and wherein said joining means further comprises connecting pin for insertion through said continuous passage to securely join adjacent top and bottom nozzle modules.

5. The fuel assembly of claim 4 wherein the interlocking fingers of adjacent top nozzle modules are dimensioned to provide an axial space therebetween to accommodate differential axial growth between adjacent sub-assembly fuel modules.

6. The fuel assembly of claim 5 further comprising shims positioned in said axial spaces to essentially fill said axial space and form a generally smooth and continuous top nozzle surface.

7. The fuel assembly of claim 1 further comprising at least two top nozzle plate modules each resiliently supported by one of said at least two sub-assembly modules for holding the fuel assembly in a relatively fixed position within a reactor core, each of said top nozzle plate modules cooperating with adjacent top nozzle plate modules to form a top nozzle plate assembly.

8. A nuclear fuel assembly comprising a plurality of sub-assembly fuel modules, each of said sub-assembly fuel modules having a skeletal structure which includes a top and bottom nozzle module, said top and bottom nozzles having respective top plate and bottom plate module sections, the top and bottom nozzle modules of adjacent sub-assembly fuel modules having joining means including an interlocking means for removably securing together the top and bottom nozzle modules of said adjacent sub-assembly fuel modules to form an easily disassembled nuclear fuel assembly comprised essentially of said sub-assembly fuel modules.

9. The nuclear fuel assembly of claim 8 wherein said joining means comprises complementary, interdigitated, finger-like members formed in adjacent top and bottom nozzle modules and means for securing said interdigitated finger-like members in place.

10. The nuclear fuel assembly of claim 9 wherein said securing means comprises a connecting pin extending through said interdigitated fingers.

11. The nuclear fuel assembly of claim 10 wherein said connecting pin is tapered to facilitate insertion and removal thereof and to ensure a snug connection between adjacent top and bottom nozzle assemblies.

12. The nuclear fuel assembly of claim 9 wherein the interdigitated finger-like members of adjacent bottom nozzle modules are of complementary size and shape and cooperate to form an essentially smooth and continuous bottom nozzle surface.

13. The nuclear fuel assembly of claim 9 wherein the interdigited finger-like members of adjacent top nozzle modules are dimensioned to form an axial space therebetween to accommodate relative axial growth between adjacent sub-assembly fuel modules.

14. The nuclear fuel assembly of claim 13 further comprising shim members disposed in said axial space to form an essentially smooth and continuous top nozzle surface.

15. A method of constructing and reconstructing a nuclear fuel assembly comprising the steps of:
(a) providing sub-assembly fuel modules, each having top and bottom nozzle module sections, said top and bottom nozzle modules sections having respective top and bottom plate module sections;
(b) interlocking adjacent sub-assembly fuel modules at said top and bottom module sections;
(c) securely joining said interlocked, adjacent sub-assembly fuel modules to form an integral fuel assembly.

16. The method of claim 15 wherein each of said bottom nozzle module sections have finger-like protrusions which interlock with finger-like protrusions of adjacent sub-assembly fuel modules and wherein said step of interlocking further comprises aligning interlocking finger-like protrusions of adjacent sub-assembly fuel modules.

17. The method of claim 15 wherein each of said top nozzle module sections have finger-like protrusions which interlock with finger-like protrusions on adjacent sub-assembly fuel modules forming an axial space between the finger-like protrusions of adjacent top nozzle module sections, and further comprising the step of axially aligning adjacent sub-assembly fuel modules within said axial space, and wherein the step of interlocking further comprising laterally aligning the interlocking finger-like protrusions of adjacent fuel assemblies.

18. The method of claim 15 further comprising the steps of removing a sub-assembly fuel module from said nuclear fuel assembly.

19. The method of claim 15 further comprising the step of providing adjacent sub-assembly fuel modules having different uranium enrichments for reducing power peaking factors and enhancing fuel utilization.

20. The method of claim 15 further comprising the step of providing adjacent sub-assembly fuel modules having different burnup distributions for reducing power peaking factors and enhancing fuel utilization.

21. The method of claim 15 further comprising the steps of:
(a) operating said nuclear fuel assembly in a nuclear reactor core;
(b) removing at least one sub-assembly fuel module from said nuclear fuel assembly;
(c) inspecting peripheral rods of the removed sub-assembly fuel module;
(d) reinserting or replacing said removed fuel module and repeating steps (a) to (c).

* * * * *